(12) United States Patent
Yang et al.

(10) Patent No.: US 12,389,341 B2
(45) Date of Patent: Aug. 12, 2025

(54) METHOD FOR REPORTING AND CONTROLLING POWER, AND TERMINAL, BASE STATION AND COMMUNICATION SYSTEM

(71) Applicant: CHINA TELECOM CORPORATION LIMITED, Beijing (CN)

(72) Inventors: Shan Yang, Beijing (CN); Bo Liu, Beijing (CN); Jianchi Zhu, Beijing (CN); Peng Chen, Beijing (CN); Xiaoming She, Beijing (CN); Xiaoyu Qiao, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 423 days.

(21) Appl. No.: 18/009,099

(22) PCT Filed: May 10, 2021

(86) PCT No.: PCT/CN2021/092634
§ 371 (c)(1),
(2) Date: Dec. 8, 2022

(87) PCT Pub. No.: WO2022/001373
PCT Pub. Date: Jan. 6, 2022

(65) Prior Publication Data
US 2023/0217376 A1 Jul. 6, 2023

(30) Foreign Application Priority Data

Jun. 30, 2020 (CN) .......................... 202010612726.6

(51) Int. Cl.
*H04W 52/28* (2009.01)
*H04W 8/24* (2009.01)

(52) U.S. Cl.
CPC ............. *H04W 52/28* (2013.01); *H04W 8/24* (2013.01)

(58) Field of Classification Search
CPC ......... H04W 52/28; H04W 8/24; H04W 8/22; H04W 52/146; H04W 52/18
See application file for complete search history.

(56) References Cited

U.S. PATENT DOCUMENTS 9,350,477 B1 * 5/2016 Jung ................. H04W 72/0446
12,232,046 B2 * 2/2025 Umeda ................. H04W 52/36
(Continued)

FOREIGN PATENT DOCUMENTS

CN 104144447 A 11/2014
CN 105282834 A 1/2016
(Continued)

OTHER PUBLICATIONS

Pulkkinen, Mika, et al. "Low-power wireless transceiver with 67-nW differential pulse-position modulation transmitter." IEEE Transactions on Circuits and Systems I: Regular Papers 67.12 (2020): 5468-5481. (Year: 2020).*

(Continued)

*Primary Examiner* — Sharad Rampuria
(74) *Attorney, Agent, or Firm* — Andrew M. Calderon; Calderon Safran & Wright P.C.

(57) ABSTRACT

Provided are a method for reporting and controlling power, and a terminal, a base station and a communication system, which relate to the field of wireless communications. The method for reporting power comprises: a terminal determining whether transmitter switching is supported; the terminal determining whether the power class when one set of transmitters is utilized is the same as the power class when multiple sets of transmitters are utilized; and where the terminal supports transmitter switching and the power class
(Continued)

when one set of transmitters is utilized is different from the power class when multiple sets of transmitters are utilized, the terminal reporting, to a base station, capability information of the terminal supporting multiple power classes, such that the base station controls the transmitting power of the terminal according to the capability information of the terminal supporting multiple power classes, thereby improving an uplink coverage range.

16 Claims, 4 Drawing Sheets

(56) References Cited

U.S. PATENT DOCUMENTS

| | | | |
|---|---|---|---|
| 2010/0184436 A1* | 7/2010 | Tachikawa | H04W 36/22 455/436 |
| 2016/0142976 A1 | 5/2016 | Li et al. | |
| 2019/0223119 A1* | 7/2019 | Takahashi | H04W 52/367 |
| 2019/0281632 A1 | 9/2019 | Sha et al. | |
| 2020/0187229 A1 | 6/2020 | Sano et al. | |
| 2021/0022083 A1 | 1/2021 | Takahashi et al. | |
| 2022/0053429 A1* | 2/2022 | Hu | H04B 1/3838 |
| 2022/0095245 A1* | 3/2022 | Wang | H04W 76/30 |

FOREIGN PATENT DOCUMENTS

| | | |
|---|---|---|
| CN | 109804677 A | 5/2019 |
| CN | 110892776 A | 3/2020 |
| CN | 11108773 A | 4/2020 |
| CN | 111106884 A | 5/2020 |
| EP | 4044695 A1 | 8/2022 |
| WO | 2019193723 A1 | 10/2019 |

OTHER PUBLICATIONS

Beikmirza, Mohammadreza, et al. "A wideband energy-efficient multi-mode CMOS digital transmitter." IEEE Journal of Solid-State Circuits 58.3 (2023): 677-690. (Year: 2023).*

International Search Report issued on Jul. 20, 2021 in corresponding Application No. PCT/CN2021/092634; 5 pages.

NTT Docomo. Inc. "R2-1806883 UE power class for NR and EN-DC" 3GPP TSG-RAN WG2 #102, May 25, 2018 (May 25, 2018); 2 pages.

3GPP TSG-RAN WG4 Meeting #86-bis R4-1805929; Melbourne, Australia, LS on power class for FR1 EN-DC and NR CA; Apr. 16-20, 2018; 1 page.

Gaopin Dianzi Xianlu; http://www.husip.com, 10 pages, partial English translation, 2016.

* cited by examiner

METHOD FOR REPORTING AND CONTROLLING POWER, AND TERMINAL, BASE STATION AND COMMUNICATION SYSTEM

CROSS-REFERENCE TO RELATED APPLICATIONS

This application is a U.S. National Stage Application under 35 U.S.C. §371 of International Patent Application PCT/CN2021/092634, filed on May 10, 2021, which is based on and claims the priority to the Chinese patent application No. 202010612726.6 filed on Jun. 30, 2020, the disclosure of both of which are hereby incorporated in its entirety into the present application.

TECHNICAL FIELD

This disclosure relates to the field of wireless communications, and particularly, to a method for reporting and controlling power, and a terminal, a base station and a communication system.

BACKGROUND

In some related art, a terminal employs a same power class no matter what operation mode the terminal operates in, such as a transmitter switching mode or a non-transmitter switching mode, and therefore, the terminal reports one power class to a base station, so that uplink coverage is limited.

SUMMARY

According to some embodiments of the present disclosure, there is provided a method for reporting power, comprising:
a terminal judging whether transmitter switching is supported;
the terminal judging whether a power class when one transmitter is used is the same as a power class when a plurality of transmitters are used; and
the terminal reporting capability information of the terminal supporting a plurality of power classes to a base station, under the condition that the transmitter switching is supported and the power class when the one transmitter is used is different from the power class when the plurality of transmitters are used.

In some embodiments, under the condition that the transmitter switching is not supported or the power class when the one transmitter is used is the same as the power class when the plurality of transmitters are used, the terminal does not report the capability information of the terminal supporting the plurality of power classes to the base station, or reports capability information of the terminal supporting one power class to the base station.

In some embodiments, the terminal judging whether transmitter switching is supported comprises: if the terminal supports both transmitting signal using the one transmitter and transmitting signal using the plurality of transmitters, judging that the transmitter switching is supported.

In some embodiments, the terminal reporting capability information of the terminal supporting a plurality of power classes to a base station comprises: the terminal reporting the capability information of the terminal supporting the plurality of power classes to the base station, under the condition that the transmitter switching is supported and the power class when the one transmitter is used is 23 dBm and the power class when two transmitters are used is 26 dBm.

In some embodiments, the terminal receives transmission power control information sent by the base station based on the capability information; and the terminal selects using the one transmitter or the plurality of transmitters to transmit signal according to the transmission power control information.

According to some embodiments of the present disclosure, there is provided a method for controlling power, comprising:
a base station receiving capability information of a terminal supporting a plurality of power classes that is reported by the terminal; and
the base station controlling transmission power of the terminal based on the plurality of power classes supported by the terminal according to the capability information.

In some embodiments, the base station controlling transmission power of the terminal comprises: the base station determining the transmission power of the terminal within a power range corresponding to the plurality of power classes supported by the terminal and notifying the terminal through transmission power control information.

According to some embodiments of the present disclosure, there is provided a terminal, comprising:
a memory; and
a processor coupled to the memory, the processor being configured to perform, based on instructions stored in the memory, the method for reporting power according to any of the embodiments.

According to some embodiments of the present disclosure, there is provided a terminal, comprising:
a first judgment module configured to judge whether transmitter switching is supported;
a second judgment module configured to judge whether a power class when one transmitter is used is the same as a power class when a plurality of transmitters are used; and
a reporting module configured to report capability information of the terminal supporting a plurality of power classes to a base station, under the condition that the transmitter switching is supported and the power class when the one transmitter is used is different from the power class when the plurality of transmitters are used.

In some embodiments, the terminal further comprises:
a receiving module configured to receive transmission power control information sent by the base station based on the capability information; and
a transmitting module configured to select using the one transmitter or the plurality of transmitters to transmit signal according to the transmission power control information.

According to some embodiments of the present disclosure, there is provided a base station, comprising:
a memory; and
a processor coupled to the memory, the processor being configured to perform, based on instructions stored in the memory, the method for controlling power according to any of the embodiments.

According to some embodiments of the present disclosure, there is provided a base station, comprising:
a receiving module configured to receive capability information of a terminal supporting a plurality of power classes that is reported by the terminal; and a power control module configured to control transmission power of the terminal based on the plurality of power classes supported by the terminal according to the capability information.

According to some embodiments of the present disclosure, there is provided a communication system, comprising: the terminal according to any of the embodiments; and the base station according to any of the embodiments.

According to some embodiments of the present disclosure, there is provided a non-transitory computer-readable storage medium having thereon stored a computer program which, when executed by a processor, implements the method for reporting power according to any of the embodiments or the method for controlling power according to any of the embodiments.

BRIEF DESCRIPTION OF THE DRAWINGS

The accompanying drawings that need to be used in the description of the embodiments or the related art will be briefly described below. The present disclosure will be more clearly understood from the following detailed description, which proceeds with reference to the accompanying drawings.

It is apparent that the drawings in the following description are merely some embodiments of the present disclosure and that other drawings can be derived by those of ordinary skill in the art without paying out creative efforts.

DETAILED DESCRIPTION

Inventors have found that some terminals have a plurality of transmitters, and these terminals can achieve higher power classes through a plurality of power amplifiers with the plurality of transmitters than through one power amplifier with one transmitter.

In the embodiments of the present disclosure, a terminal reports capability information of supporting a plurality of power classes to a base station, under the condition that transmitter switching is supported and a power class when one transmitter is used is different from a power class when a plurality of transmitters are used, so that the base station controls transmission power of the terminal according to the capability information, to improve uplink coverage.

The technical solutions in the embodiments of the present disclosure will be clearly and completely described below with reference to the drawings in the embodiments of the present disclosure.

Figure 1:
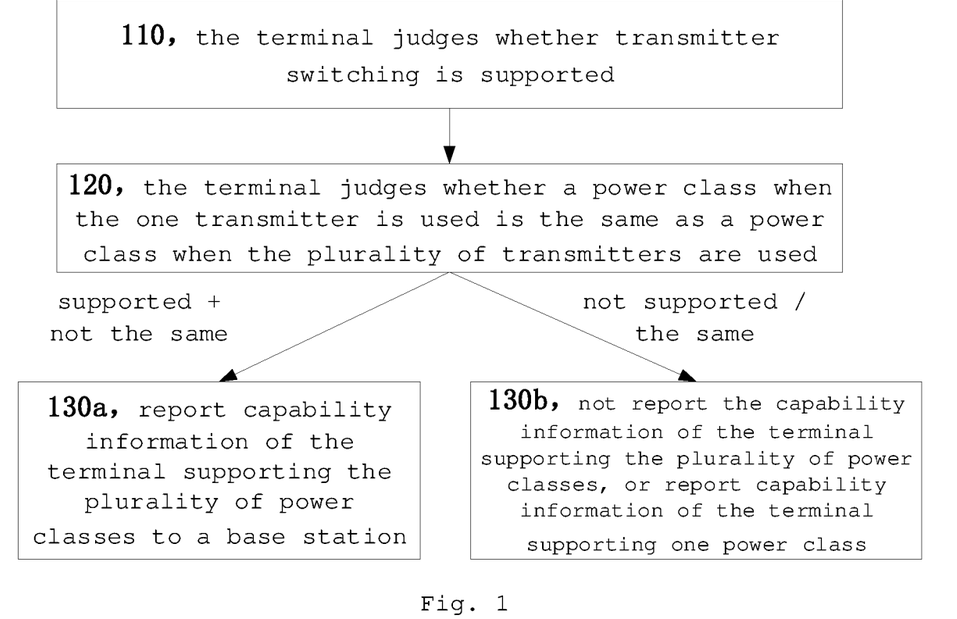
FIG. 1 illustrates a schematic flow diagram of a method for reporting power according to some embodiments of the present disclosure.

FIG. 1 illustrates a flow diagram of a method for reporting power according to some embodiments of the present disclosure.

As shown in FIG. 1, the method for this embodiment comprises: steps 110 to 130a/b.

In the step 110, the terminal judges whether transmitter switching is supported.

The terminal judging whether transmitter switching is supported comprises: if the terminal supports both transmitting signal using one transmitter and transmitting signal using a plurality of transmitters, judging that the transmitter switching is supported, otherwise, judging that the transmitter switching is not supported.

For example, if a terminal supports both transmitting signal using one transmitter and transmitting signal using two transmitters, it is judged that transmitter switching is supported, otherwise, it is judged that the transmitter switching is not supported.

In step 120, the terminal judges whether a power class when the one transmitter is used is the same as a power class when the plurality of transmitters are used.

For example, when one transmitter (with one power amplifier) is used, a power class (set as a power class 3) of 23 dBm can be achieved, and when two transmitters (with 2 power amplifiers) are used, a power class (set as a power class 2) of 23 dBm+23 dBm=26 dBm can be achieved, and at this time, it is judged that the power class when the one transmitter is used is different from the power class when the two transmitters are used. dBm stands for "decibel relative to one milliwatt", which represents decibel milliwatt, and dBm is one absolute value for power and differs from dB that is just a relative value.

The power class represents a maximum capability of the power amplifier(s), wherein a power value less than the power class can also be achieved by the power amplifier(s).

In the step 130a, the terminal reports capability information of the terminal supporting the plurality of power classes to a base station, under the condition that the transmitter switching is supported and the power class when the one transmitter is used is different from the power class when the plurality of transmitters are used. That is, the capability information of the plurality of power classes comprises: the power class when the one transmitter is used and the power class when the plurality of transmitters are used.

For example, under the condition that transmitter switching is supported and a power class when one transmitter is used is 23 dBm, and a power class when 2 transmitters are used is 26 dBm, the terminal reports capability information of the terminal supporting a plurality of power classes to a base station.

In addition, if the terminal has reported capability information of supporting the power class of 23 dBm to the base station previously, capability information of supporting the power class of 26 dBm can be newly reported to the base station.

In some embodiments, the capability information of the terminal supporting the plurality of power classes comprises at least one of: power class information of each frequency band combination supporting the transmitter switching, or power class information of one or more frequency bands within each frequency band combination supporting the transmitter switching.

In the step 130b, the terminal does not report the capability information of the terminal supporting the plurality of power classes to the base station or reports capability information of the terminal supporting one power class to the base station, under the condition that the transmitter switching is not supported or the power class when the one transmitter is used is the same as the power class when the plurality of transmitters are used.

That is, the reporting of the capability information of supporting the plurality of power classes is up to the terminal. If the terminal supports the transmitter switching and reports the capability information of supporting the plurality of power classes, the additionally reported power class is used in a "transmitter switching" mode. If the terminal supports the transmitter switching and does not report the capability information of supporting the plurality of power classes, a capability class that is the same as a capability class in a "non-transmitter switching" mode can be used in the "transmitter switching" mode.

In a current network, some terminals with high-end performance have power amplifier(s) of 26 dBm, while in the current network, there are also many terminals with mid-range performance, which have only power amplifier(s) of 23 dBm, but a high power class of 23 dBm+23 dBm=26 dBm can be achieved by two power amplifiers of 23 dBm.

In the above embodiment, the terminal reports the capability information of supporting the plurality of power classes to the base station, under the condition that transmitter switching is supported and the power class when the one transmitter is used is different from the power class when the plurality of transmitters are used, so that the base station controls the transmission power of the terminal according to the capability information, to improve uplink coverage.

The above method for reporting power can be applied to a mobile communication network of multi-band operation, and the terminal can additionally report capability information of one power class as needed.

Figure 2:
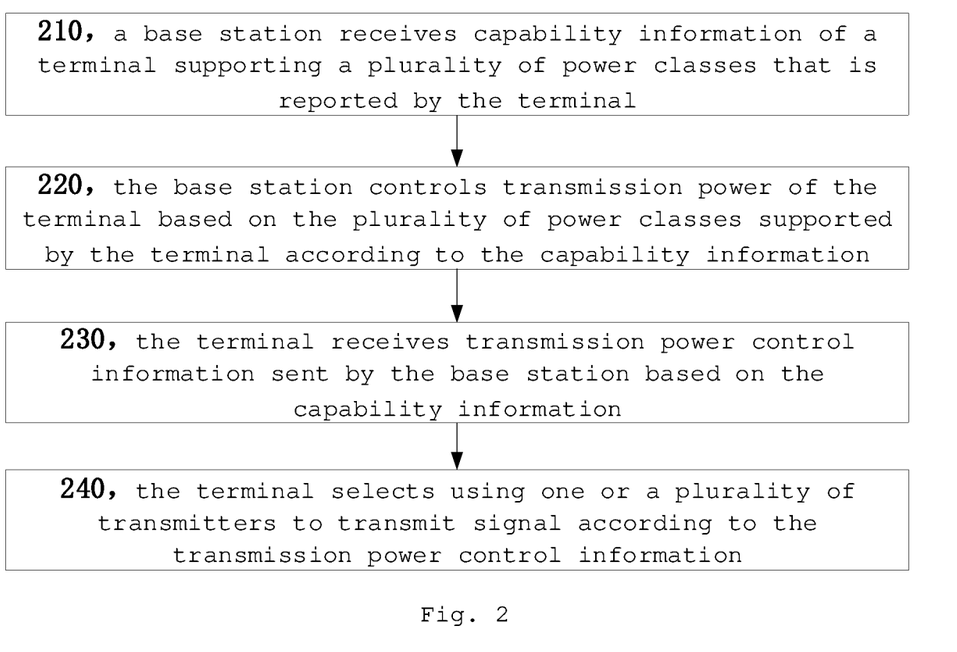
FIG. 2 illustrates a schematic flow diagram of a method for controlling power according to some embodiments of the present disclosure.

FIG. 2 illustrates a schematic flow diagram of a method for controlling power according to some embodiments of the present disclosure.

As shown in FIG. 2, the method for this embodiment comprises: steps 210 to 240.

In the step 210, a base station receives capability information of a terminal supporting a plurality of power classes that is reported by the terminal.

The capability information of the terminal supporting the plurality of power classes can be reported one or more times.

In the step 220, the base station controls transmission power of the terminal based on the plurality of power classes supported by the terminal according to the capability information.

For example, a base station determines transmission power of a terminal within a power range corresponding to a plurality of power classes supported by the terminal, and notifies the terminal through transmission power control information.

In the step 230, the terminal receives transmission power control information sent by the base station based on the capability information.

In the step 240, the terminal selects using one or a plurality of transmitters to transmit signal according to the transmission power control information.

For example, if a base station indicates that transmission power of a terminal is 26 dBm and a maximum capability of one power amplifier of the terminal is 23 dBm, the terminal uses two transmitters (including 2 power amplifiers) to achieve the transmission power of 26 dBm. For another example, if a base station indicates that transmission power of a terminal is 23 dBm, the terminal can use one transmitter to achieve the transmission power of 23 dBm.

In the above embodiment, the base station receives the capability information of supporting the plurality of power classes that is reported by the terminal, so that the base station controls the transmission power of the terminal according to the capability information, to improve uplink coverage.

Figure 3:
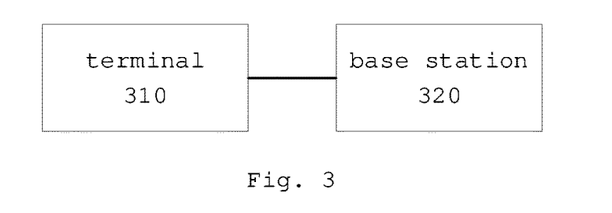
FIG. 3 illustrates a schematic diagram of a communication system according to some embodiments of the present disclosure.

FIG. 3 illustrates a schematic diagram of a communication system according to some embodiments of the present disclosure.

As shown in FIG. 3, the communication system of this embodiment comprises: a terminal 310 and a base station 320. For operations performed by the terminal 310 and the base station 320, reference is made to the foregoing embodiments, which are not repeated herein.

Figure 4:
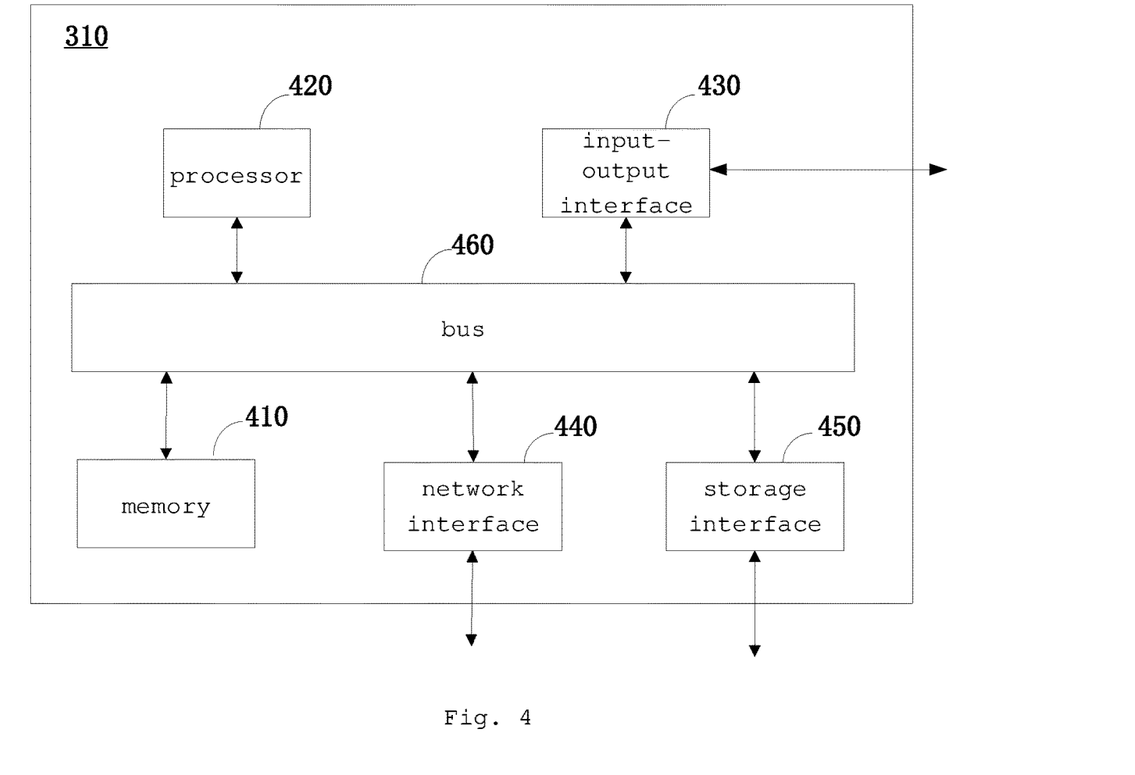
FIG. 4 illustrates a schematic diagram of a terminal according to some embodiments of the present disclosure.

FIG. 4 illustrates a schematic diagram of a terminal according to some embodiments of the present disclosure.

As shown in FIG. 4, the terminal 310 of this embodiment comprises: a memory 410 and a processor 420 coupled to the memory 410, the processor 420 being configured to perform, based on instructions stored in the memory 410, the method for reporting power in any of the embodiments described above.

For example, a terminal judges whether transmitter switching is supported; the terminal judges whether a power class when one transmitter is used is the same as a power class when a plurality of transmitters are used; the terminal reports capability information of the terminal supporting a plurality of power classes to a base station, under the condition that the transmitter switching is supported and the power class when the one transmitter is used is different from the power class when the plurality of transmitters are used; the terminal does not report the capability information of the terminal supporting the plurality of power classes to the base station or reports capability information of the terminal supporting one power class to the base station, under the condition that the transmitter switching is not supported or the power class when the one transmitter is used is the same as the power class when the plurality of transmitters are used.

The memory 410 can include, for example, a system memory, fixed non-volatile storage medium, and the like. The system memory has thereon stored, for example, an operating system, application, boot loader, other programs, and the like.

The terminal 310 can also include an input-output interface 430, network interface 440, storage interface 450, and the like. These interfaces 430, 440, 450 as well as the memory 410 and the processor 420 can be connected, for example, through a bus 460. The input/output interface 430 provides a connection interface for input/output devices such as a display, a mouse, a keyboard, and a touch screen. The network interface 440 provides a connection interface for various networking devices. The storage interface 450 provides a connection interface for external storage devices such as an SD card and a USB disk.

Figure 5:
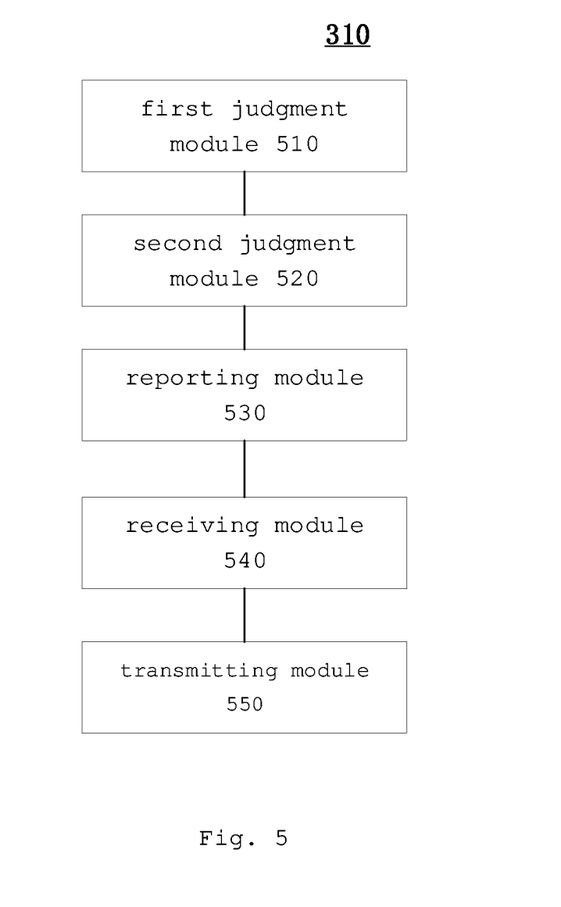
FIG. 5 illustrates a schematic diagram of a terminal according to other embodiments of the disclosure.

FIG. 5 illustrates a schematic diagram of a terminal according to other embodiments of the present disclosure.

As shown in FIG. 5, the terminal 310 of this embodiment comprises:

a first judgment module 510 configured to judge whether transmitter switching is supported;

a second judgment module 520 configured to judge whether a power class when one transmitter is used is the same as a power class when a plurality of transmitters are used; and a reporting module 530 configured to report capability information of the terminal supporting a plurality of power classes to a base station, under the condition that the transmitter switching is supported and the power class when the one transmitter is used is different from the power class when the plurality of transmitters are used.

In some embodiments, the terminal 310 further comprises:

a receiving module 540 configured to receive transmission power control information sent by the base station based on the capability information; and a transmitting module 550 configured to select using the one transmitter or the plurality of transmitters to transmit signal according to the transmission power control information.

Figure 6:
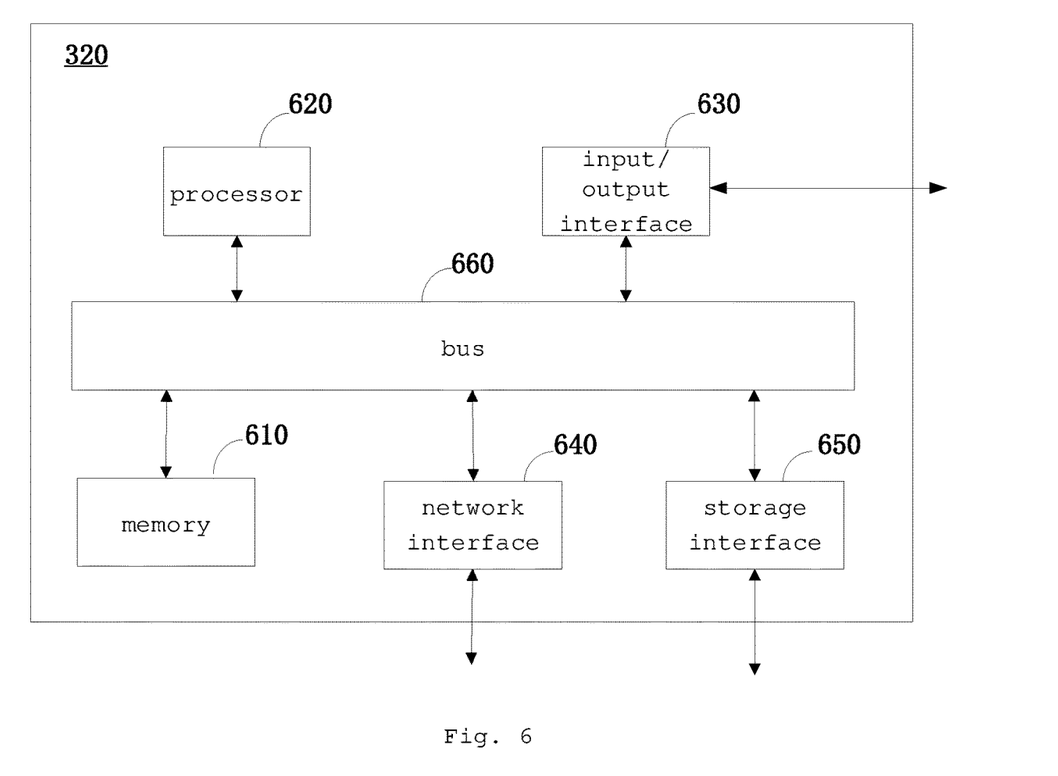
FIG. 6 illustrates a schematic diagram of a base station according to some embodiments of the present disclosure.

FIG. 6 illustrates a schematic diagram of a base station according to some embodiments of the present disclosure.

As shown in FIG. 6, the base station 320 of this embodiment comprises: a memory 610 and a processor 620 coupled to the memory 610, the processor 620 being configured to perform, based on instructions stored in the memory 610, the method for controlling power according to any of the embodiments.

For example, a base station receives capability information of a terminal supporting a plurality of power classes that is reported by the terminal, and controls transmission power of the terminal based on the plurality of power classes supported by the terminal according to the capability information.

The memory 610 can include, for example, a system memory, fixed non-volatile storage medium, and the like. The system memory has thereon stored, for example, an operating system, application, boot loader, other program, and the like.

The base station 320 can also comprise an input/output interface 630, network interface 640, storage interface 650, and the like. These interfaces 630, 640, 650 as well as the memory 610 and the processor 620 can be connected, for example, through a bus 660. The input/output interface 630 provides a connection interface for input/output devices such as a display, a mouse, a keyboard, and a touch screen. The network interface 640 provides a connection interface for various networking devices. The storage interface 650 provides a connection interface for external storage devices such as an SD card and a USB disk.

Figure 7:
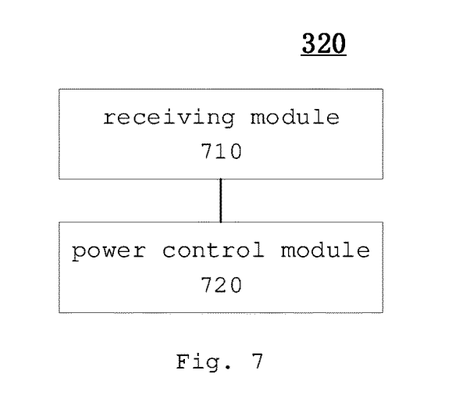
FIG. 7 illustrates a schematic diagram of a base station according to other embodiments of the present disclosure.

FIG. 7 illustrates a schematic diagram of a base station according to other embodiments of the present disclosure.

As shown in FIG. 7, the base station 320 of this embodiment comprises:

a receiving module 710 configured to receive capability information of a terminal supporting a plurality of power classes that is reported by the terminal; and a power control module 720 configured to control transmission power of the terminal based on the plurality of power classes supported by the terminal according to the capability information. For example, transmission power of the terminal is determined within a power range corresponding to a plurality of power classes supported by the terminal, and the terminal is notified through transmission power control information.

A non-transitory computer-readable storage medium according to some embodiments of the present disclosure has thereon stored a computer program which, when executed by a processor, implements the method for reporting power or the method for controlling power.

It should be appreciated by those skilled in the art, the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more non-transitory computer-readable storage media (including, but not limited to, a disk memory, CD-ROM, optical memory, etc.) having computer program code embodied therein.

The present disclosure is described with reference to flow diagrams and/or block diagrams of the method, device (system), and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing the function specified in one or more flows of the flow diagrams and/or one or more blocks of the block diagrams.

These computer program instructions can also be stored in a computer-readable memory that can guide a computer or other programmable data processing devices to work in a specific manner, such that the instructions stored in the computer-readable memory produce an article of manufacture including instruction means which implement the functions specified in one or more flows of the flow diagrams and/or one or more blocks of the block diagrams.

These computer program instructions can also be loaded onto a computer or other programmable data processing devices, so that a series of operational steps are performed on the computer or other programmable devices to produce a computer-implemented process, and therefore the instructions executed on the computer or other programmable devices provide steps for implementing the functions specified in one or more flows of the flow diagrams and/or one or more blocks of the block diagrams.

The above description is merely the preferred embodiments of the present disclosure and is not used for limiting the present disclosure, and any modifications, equivalents, improvements and the like that are made within the spirit and principle of the present disclosure should be included in the protection scope of the present disclosure.

What is claimed is:

1. A method for reporting power, comprising:

a terminal judging whether transmitter switching is supported;

the terminal judging whether a power class when one transmitter is used is the same as a power class when a plurality of transmitters are used; and the terminal reporting capability information of the terminal supporting a plurality of power classes to a base station, under the condition that the transmitter switching is supported and the power class when the one transmitter is used is different from the power class when the plurality of transmitters are used, wherein the terminal reporting capability information of the terminal supporting a plurality of power classes to a base station comprises:

the terminal reporting the capability information of the terminal supporting the plurality of power classes to the base station,
under the condition that the transmitter switching is supported and
the power class when the one transmitter is used is 23 dBm and the power class when two transmitters are used is 26 dBm.

2. The method according to claim 1, further comprising:
under the condition that the transmitter switching is not supported or the power class when the one transmitter is used is the same as the power class when the plurality of transmitters are used, the terminal not reporting the capability information of the terminal supporting the plurality of power classes to the base station, or reporting capability information of the terminal supporting one power class to the base station.

3. The method according to claim 1, wherein the terminal judging whether transmitter switching is supported comprises:
if the terminal supports both transmitting signal using the one transmitter and transmitting signal using the plurality of transmitters, judging that the transmitter switching is supported.

4. The method according to claim 1, further comprising:
the terminal receiving transmission power control information sent by the base station based on the capability information; and
the terminal selecting using the one transmitter or the plurality of transmitters to transmit signal according to the transmission power control information.

5. The method according to claim 1, wherein the capability information of the terminal supporting the plurality of power classes comprises at least one of:
power class information of each frequency band combination supporting the transmitter switching, or
power class information of one or more frequency bands within each frequency band combination supporting the transmitter switching.

6. A terminal, comprising:
a memory; and
a processor coupled to the memory, the processor being configured to perform, based on instructions stored in the memory, the method for reporting power according to claim 1.

7. A non-transitory computer-readable storage medium having thereon stored a computer program which, when executed by a processor, implements the method for reporting power according to claim 1.

8. The terminal according to claim 6, the processor is configured to judge that the transmitter switching is supported if the terminal supports transmitting signal using the one transmitter and transmitting signal using the plurality of transmitters.

9. The terminal according to claim 6, the processor is configured to report the capability information of the terminal supporting the plurality of power classes to the base station, under the condition that the transmitter switching is supported and the power class when the one transmitter is used is 23 dBm and the power class when two transmitters are used is 26 dBm.

10. The terminal according to claim 6, the processor is configured to
receive transmission power control information sent by the base station based on the capability information; and
select using the one transmitter or the plurality of transmitters to transmit signal according to the transmission power control information.

11. A method for controlling power, comprising:
a base station receiving capability information of a terminal supporting a plurality of power classes that is reported by the terminal; and
the base station controlling transmission power of the terminal based on the plurality of power classes supported by the terminal according to the capability information,
wherein the capability information of the terminal supporting a plurality of power classes to a base station comprises:
the capability information of the terminal supporting the plurality of power classes to the base station,
under the condition that a transmitter switching is supported and the power class when the one transmitter is used is 23 dBm and the power class when two transmitters are used is 26 dBm.

12. The method according to claim 11, wherein the base station controlling transmission power of the terminal comprises:
the base station determining the transmission power of the terminal within a power range corresponding to the plurality of power classes supported by the terminal and notifying the terminal through transmission power control information.

13. A non-transitory computer-readable storage medium having thereon stored a computer program which, when executed by a processor, implements the method for controlling power according to claim 11.

14. A base station, comprising:
a memory; and
a processor coupled to the memory, the processor being configured to perform, based on instructions stored in the memory, the method for controlling power according to claim 11.

15. The base station according to claim 14, the processor is configured to determine the transmission power of the terminal within a power range corresponding to the plurality of power classes supported by the terminal and notify the terminal through transmission power control information.

16. A communication system, comprising:
a terminal, comprising:
a first judgment module configured to judge whether transmitter switching is supported;
a second judgment module configured to judge whether a power class when one transmitter is used is the same as a power class when a plurality of transmitters are used; and
a reporting module configured to report capability information of the terminal supporting a plurality of power classes to a base station,
under the condition that the transmitter switching is supported and the power class when the one transmitter is used is different from the power class when the plurality of transmitters are used; and
a base station, comprising:
a receiving module configured to receive capability information of a terminal supporting a plurality of power classes that is reported by the terminal; and
a power control module configured to control transmission power of the terminal based on the plurality of power classes supported by the terminal according to the capability information, wherein the capability information of the terminal supporting a plurality of power classes to a base station comprises:

the capability information of the terminal supporting the plurality of power classes to the base station, under the condition that the transmitter switching is supported and the power class when the one transmitter is used is 23 dBm and the power class when two transmitters are used is 26 dBm.

* * * * *